United States Patent [19]
Wanger et al.

[11] Patent Number: 5,101,387
[45] Date of Patent: Mar. 31, 1992

[54] LATERAL DISPLACEMENT CONTROL ASSEMBLY FOR AN OPTICAL DISK HANDLING SYSTEM

[75] Inventors: Mark E. Wanger; Jennifer L. Methlie; Donald J. Stavely; Thomas C. Oliver, all of Fort Collins, Colo.

[73] Assignee: Hewlett-Packard Company, Palo Alto, Calif.

[21] Appl. No.: 298,388

[22] Filed: Jan. 18, 1989

[51] Int. Cl.$^5$ .................. G11B 17/00; G11B 5/48; G11B 17/12
[52] U.S. Cl. .................... 369/36; 369/34; 360/92; 414/277; 414/280
[58] Field of Search .............. 369/34, 35, 36, 37, 369/38, 75.2, 77.1; 360/99.02, 99.06, 92

[56] References Cited

U.S. PATENT DOCUMENTS

| | | |
|---|---|---|
| 4,135,245 | 1/1979 | Kemplin et al. . |
| 4,170,030 | 10/1979 | Castrodale et al. . |
| 4,417,258 | 11/1983 | Tribolet et al. . |
| 4,527,262 | 7/1985 | Manto .................. 369/33 |
| 4,573,129 | 2/1986 | Tribolet et al. . |
| 4,607,354 | 8/1986 | Ishibashi et al. .......... 369/36 X |
| 4,608,679 | 8/1986 | Rudy et al. . |
| 4,675,856 | 6/1987 | Rudy et al. . |
| 4,685,095 | 8/1987 | Rudy et al. ................ 369/36 |
| 4,742,504 | 5/1988 | Takasuka et al. .......... 369/36 |
| 4,786,995 | 11/1988 | Stupeck et al. . |
| 4,787,074 | 11/1988 | Deck et al. ............. 369/195 X |
| 4,797,865 | 1/1989 | Imai et al. . |
| 4,815,055 | 3/1989 | Fago, Jr. ................. 369/36 |
| 4,817,070 | 3/1989 | Hug et al. . |
| 4,817,071 | 3/1989 | Carlson et al. . |
| 4,827,463 | 5/1989 | Motoyoshi et al. . |
| 4,839,758 | 6/1989 | Honjoh . |
| 4,853,916 | 8/1989 | Tomita . |
| 4,879,615 | 11/1989 | Teranishi et al. ........... 369/34 |
| 4,891,720 | 1/1990 | Grant et al. ............. 369/36 X |
| 4,912,575 | 3/1990 | Shiosaki . |
| 4,918,548 | 4/1990 | O'Donnell et al. . |

FOREIGN PATENT DOCUMENTS

| | | |
|---|---|---|
| 0067449 | 6/1982 | European Pat. Off. . |
| 139327 | 5/1985 | European Pat. Off. . |
| 288165 | 10/1988 | European Pat. Off. . |
| 2594588 | 8/1987 | France . |
| 2610132 | 7/1988 | France . |
| 2449944 | 9/1989 | France . |
| 60-229268 | 4/1986 | Japan . |
| 60-256968 | 5/1986 | Japan . |
| 62-219364 | 3/1988 | Japan . |
| 1183243 | 3/1970 | United Kingdom . |
| 2106696 | 4/1983 | United Kingdom . |

*Primary Examiner*—Stuart S. Levy
*Assistant Examiner*—Kenneth B. Wells

[57] ABSTRACT

A mechanical assembly for alternately producing displacement of a carriage with respect to a carriage track and rotation of a gear mounted on the carriage, in response to torque provided from a single drive motor comprising: a latching assembly, having a latched state and an unlatched state, operably associated with the carriage for preventing relative movement between the carriage and the track during the latched state; and a locking assembly, having a locked state and an unlocked state, operatively associated with the gear for preventing relative rotation of the gear during the locked state.

26 Claims, 4 Drawing Sheets

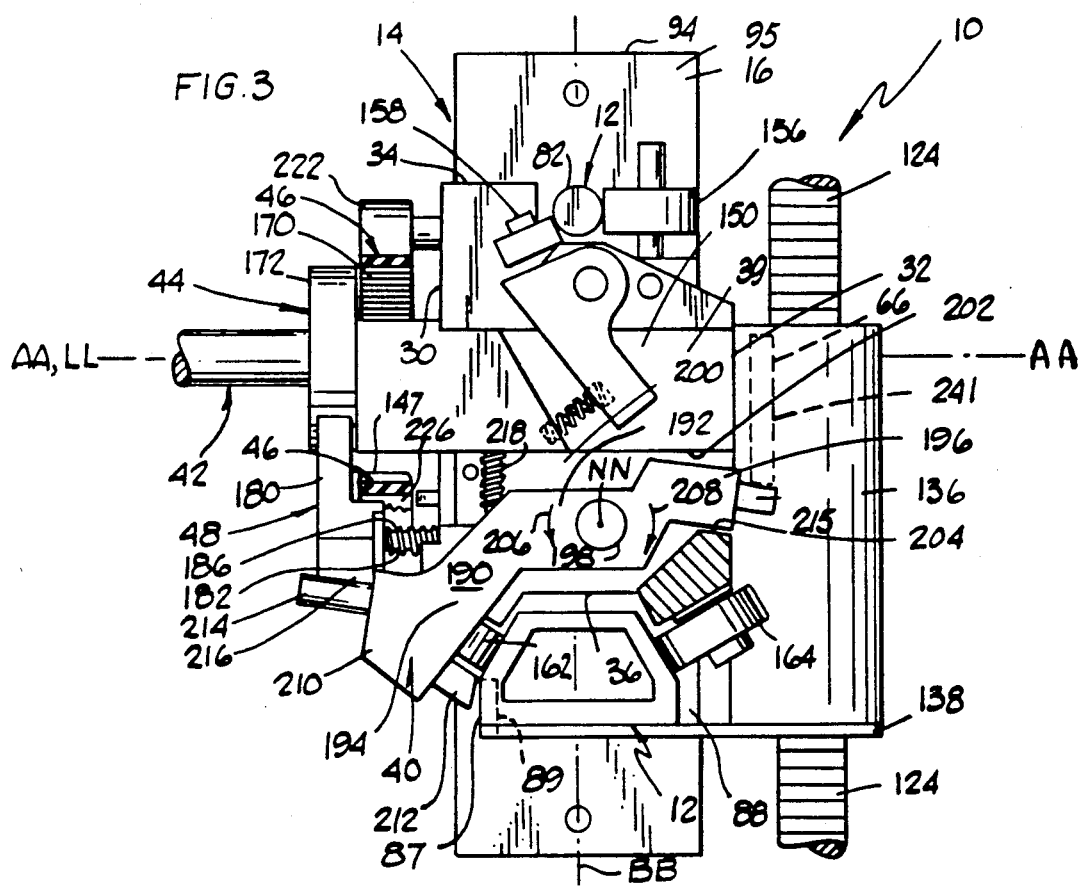
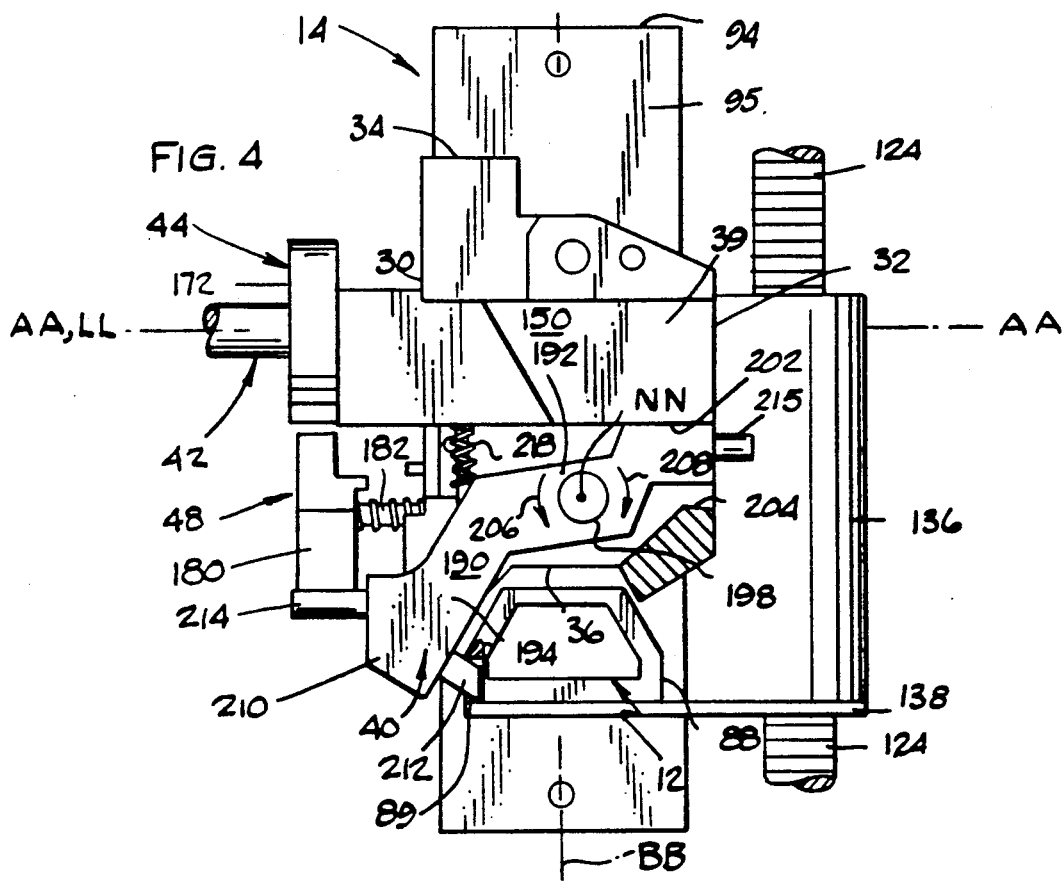

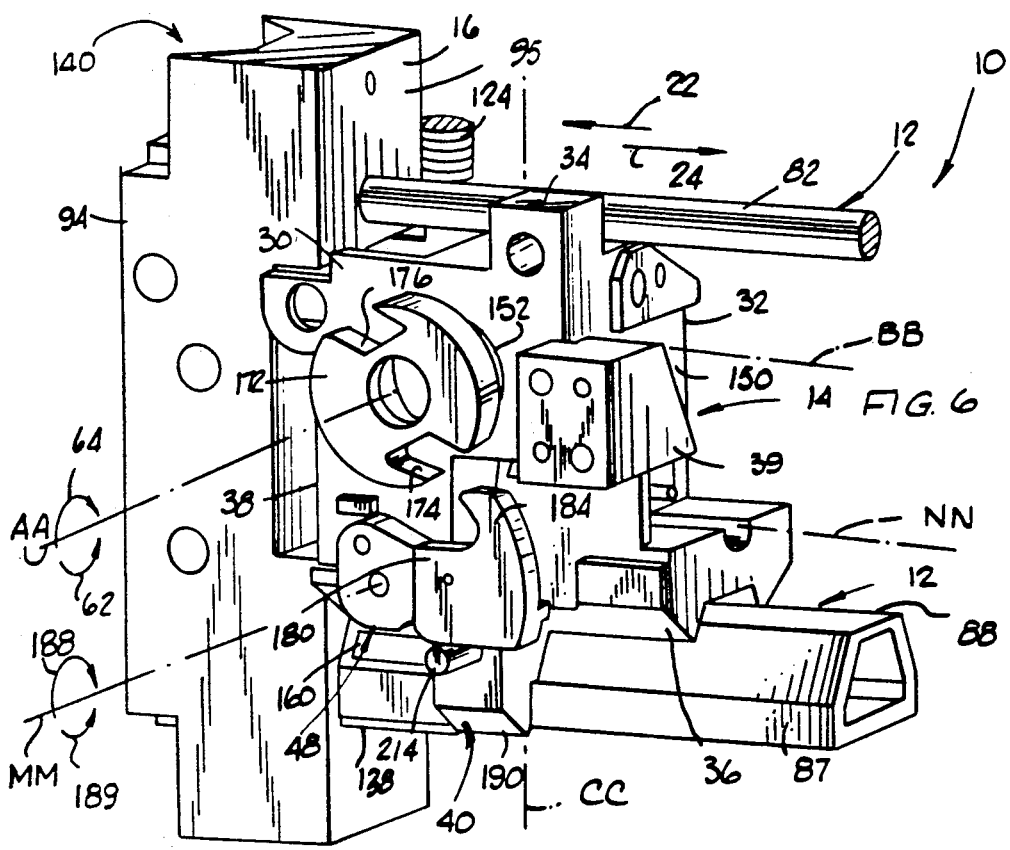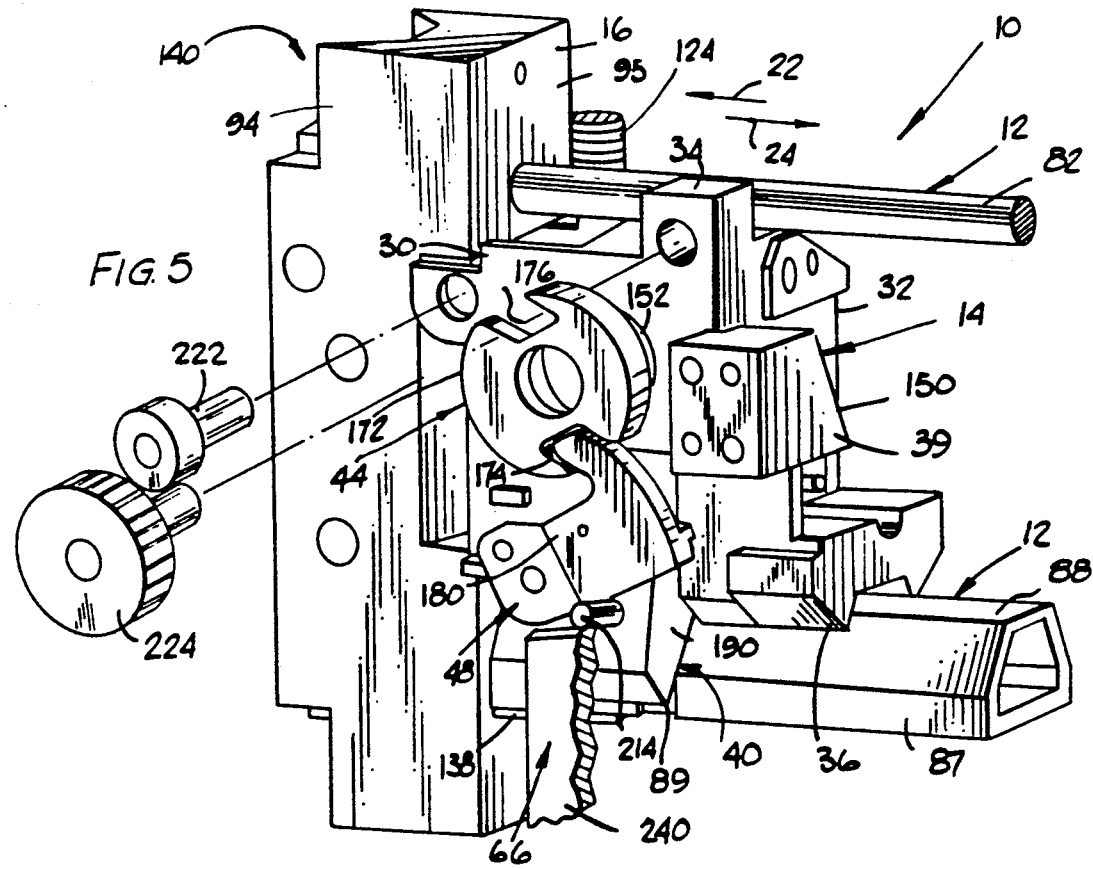

LATERAL DISPLACEMENT CONTROL ASSEMBLY FOR AN OPTICAL DISK HANDLING SYSTEM

BACKGROUND OF THE INVENTION

The present invention relates generally to an apparatus for handling and storing optical disks and, more particularly, to an apparatus for providing controlled lateral displacement of an optical disk within an optical disk handling system.

An optical disk is a data storage medium which is readable by a laser-based reading device. Optical disks known as "compact disks" or "CDs" have become increasing popular during the past few years for recording music and audio-video works Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recent technology has produced optical disks which are both computer readable and computer writable. Thus, in the future, optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are generally mounted in parallelepiped-shaped cartridges. Optical disk reading devices generally receive a disk which is to be read through a narrow slot provided on the front surface of the device. Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk reader. In a disk storage system wherein the stored disks and an associated disk reader are arranged in a longitudinally extending, two-dimensional array consisting of vertically extending columns and laterally extending rows, it is necessary for a disk handling system to be capable of engaging and moving each disk vertically, laterally, and longitudinally in order to remove it from storage, move it into aligned relationship with the disk reader, and insert it into the disk reader. It may also be necessary for the disk handling system to flip the disk to reverse the side thereof which will be positioned in readable relationship with a reader.

In order to decrease production and maintenance costs and to increase reliability of such a disk handling system, it is generally desirable to reduce the number of separate drive units to a minimum. It is also desirable to minimize or eliminate the type of mechanical systems such as, for example, clutch assemblies, which are particularly subject to malfunction under frequent use conditions It is also desirable to minimize the use of sensing devices which are particularly subject to malfunction such as, for example, photoelectric or magnetic proximity sensors. It is also desirable to minimize the mounting of sensors or motors on moving system components to eliminate problems associated with moving lead wires, etc.

SUMMARY OF THE INVENTION

The present invention is directed to an apparatus which is adapted to provide controlled lateral displacement of an optical disk. The apparatus may be a component of an optical disk handling system which provides three-dimensional linear displacement as well as flipping, angular displacement of an engaged optical disk.

The apparatus of the present invention includes a gear which is rotatably mounted on a carriage assembly. The gear is continuously engaged by a drive belt. The carriage assembly is laterally displaced by force applied through the drive belt during a first mode of operation. The carriage assembly remains stationary and force from the drive belt is used to rotate the gear mounted on the carriage assembly in a second mode of operation. The apparatus changes operating modes through the action of latching and locking assemblies associated with the carriage assembly and rotatable gear. The latching and locking assemblies are reliable, low maintenance devices which obviate the need for more complex and less reliable clutch assemblies or additional drive units.

In one specific application of the invention, the rotation gear may be drivingly linked to an optical disk handling apparatus of the type described in Methlie et al., U.S. patent application Ser. No. 278,102 filed 11/30/88 for OPTICAL DISK HANDLING APPARATUS, which is hereby specifically incorporated by reference for all that it discloses and which forms a part of this disclosure as though fully set forth herein.

The present invention may comprise an apparatus for providing controlled displacement of an object. The apparatus may comprise a laterally extending track adapted for receiving a carriage thereon in laterally displaceable relationship therewith. The track defines a laterally extending carriage movement path First and second stop devices are provided for limiting lateral displacement of the carriage along the laterally extending carriage movement path in a first lateral direction and a second lateral direction, respectively.

The carriage is mounted on the track and is adapted for carrying an object along the laterally extending carriage movement path in the first lateral direction and the second lateral direction. The carriage has a forward end portion, a rear end portion, a top end portion, a bottom end portion, a first lateral side portion, a second lateral side portion, a central longitudinal axis, a central lateral axis, and a central vertical axis. The carriage central lateral axis extends parallel to the laterally extending carriage movement path. The carriage has a latched operating state wherein movement thereof along the laterally extending carriage movement path in both the first and second lateral directions is latchingly prevented. The carriage has an unlatched operating state wherein movement thereof along the laterally extending carriage movement path in both the first and second lateral directions is unlatchingly enabled.

A latching assembly is operably associated with the carriage and the laterally extending track. The latching assembly is used to place the carriage in the latched operating state and the unlatched operating state.

A shaft is operably mounted on the carriage and projects forwardly therefrom. The shaft has a central longitudinal axis extending generally parallel to the carriage central longitudinal axis. The shaft supports a driven gear thereon.

The driven gear mounted on the shaft is rotatable about the shaft central longitudinal axis and engages a drive belt. The gear transmits force from the drive belt to the carriage for laterally displacing the carriage when the apparatus is operating in the first operating mode. The driven gear has a locked operating state associated with the first operating mode of the apparatus wherein the driven gear is lockingly restrained from rotating and has an unlocked state wherein the driven gear is unlockingly enabled to rotate. A locking assembly is provided for lockingly engaging the driven gear for placing the driven gear in the locked operating state and for unlockingly releasing the driven gear for placing the driven gear in the unlocked operating state.

The drive belt which is engaged with the driven gear has a first portion extending from the driven gear in the first lateral direction and has a second portion extending from the driven gear in the second lateral direction. Force transmitted from the drive belt to the driven gear in the first lateral direction produces rotation of the driven gear in a first rotation direction when the driven gear is in the unlocked operating state and when the carriage is in its latched operating state. Force transmitted from the drive belt to the driven gear in the first lateral direction produces lateral displacement of the carriage in the first lateral direction when the driven gear is in its locked operating state and when the carriage is in its unlatched operating state and when the carriage is disengaged from the first stop. Force transmitted from the drive belt to the driven gear in the second lateral direction produces rotation of the driven gear in a second rotation direction when the driven gear is in its unlocked operating state and when the carriage is in its latched operating state. Force transmitted from the drive belt to the driven gear in the second lateral direction produces lateral displacement of the carriage in the second lateral direction when the driven gear is in its locked operating state and when the carriage is in its unlatched operating state and when the carriage is disengaged from the second stop.

The present invention may also comprise a mechanical assembly for alternately producing displacement of a carriage with respect to a carriage track and rotation of a gear mounted on the carriage, in response to torque provided from a single drive motor.

The mechanical assembly may comprise a latching assembly, having a latched state and an unlatched state, operably associated with the carriage for latchingly preventing relative movement between the carriage and the track during the latched state.

A locking assembly is provided which has a locked state and an unlocked state. The locking assembly is operatively associated with the carriage for lockingly preventing relative rotation of the gear during the locked state. The latching and locking assemblies are constructed and arranged such that the latching assembly is in its latched state when the locking assembly is in its unlocked state and vice versa.

BRIEF DESCRIPTION OF THE DRAWINGS

An illustrative and presently preferred embodiment of the invention is shown in the accompanying drawings in which:

FIG. 3 is a partially cut-away, right side elevation view of a carriage assembly and associated locking and latching assemblies in one operating state.

FIG. 4 is a right side elevation view of the carriage, locking, and latching assemblies of FIG. 3 in another operating state thereof.

FIG. 5 is a perspective view of a carriage, locking, and latching assembly in the same operating state as FIG. 3.

FIG. 6 is a perspective view of a carriage, locking, and latching assembly in the same operating state as FIG. 4.

DETAILED DESCRIPTION OF THE PREFERRED EMBODIMENT OF THE INVENTION

In General

Figure 1:
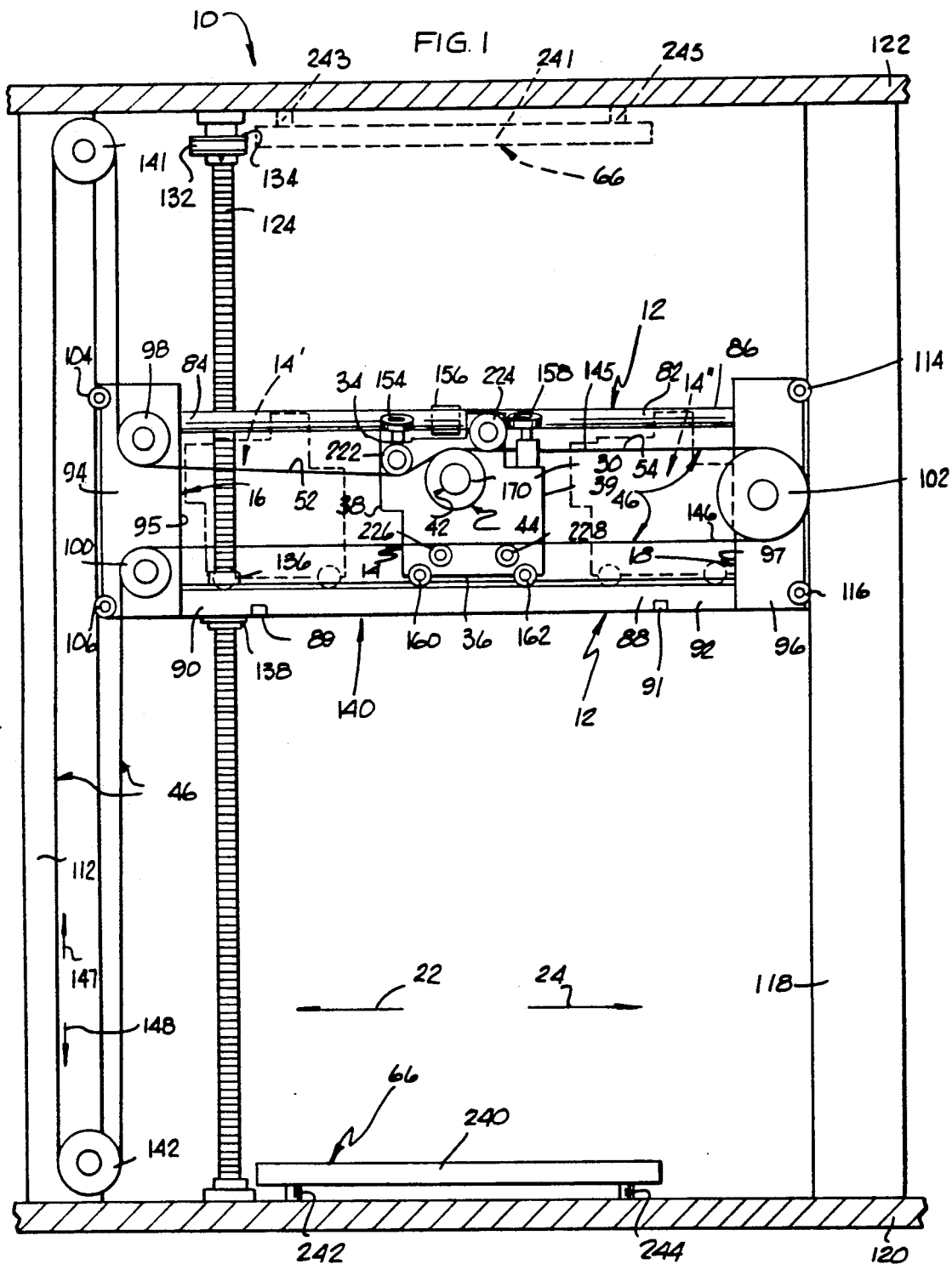
FIG. 1 is a front elevation view of portions of an apparatus for providing controlled lateral displacement of an optical disk cartridge.
Figure 2:
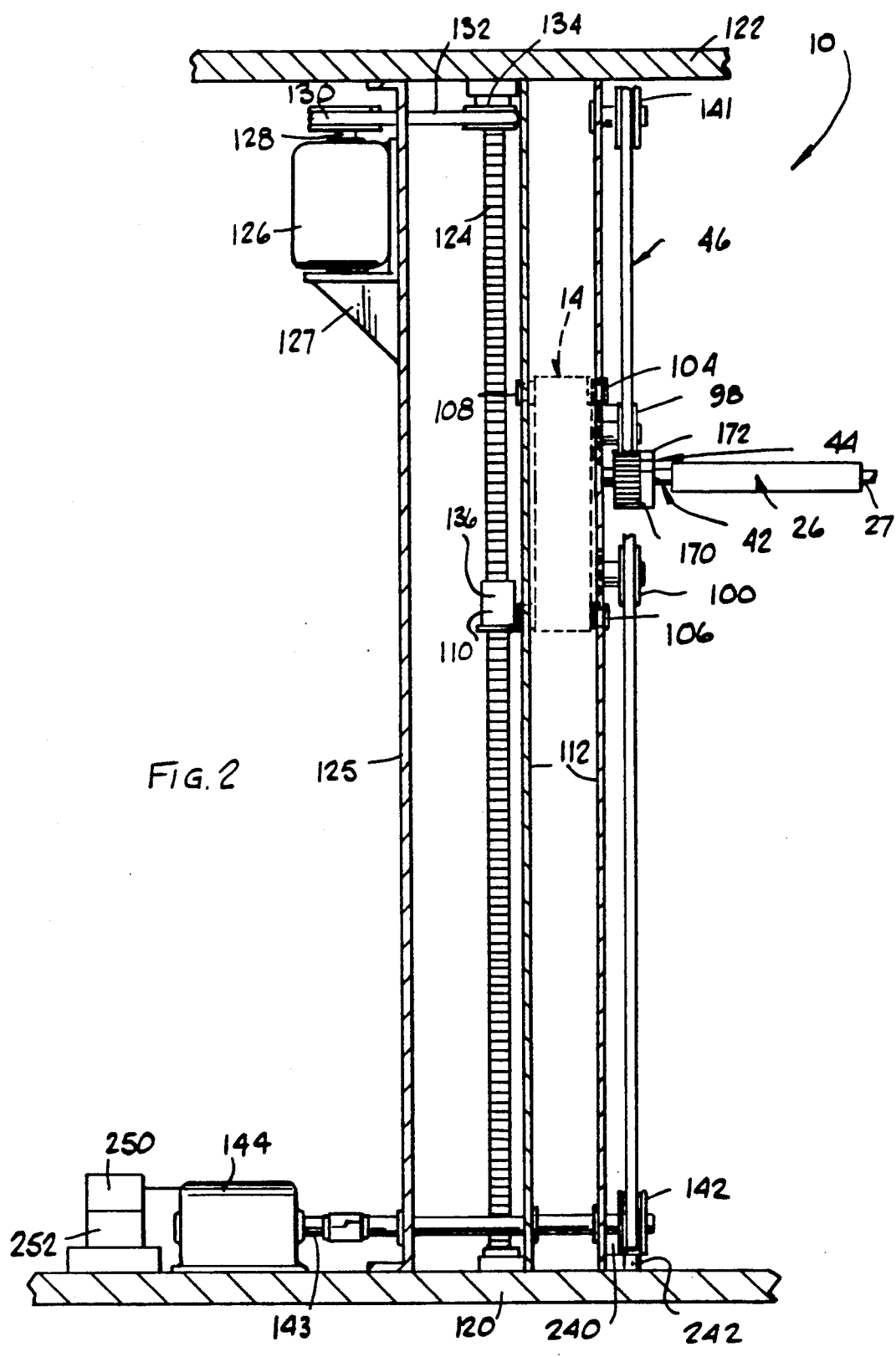
FIG. 2 is a left side elevation view of the apparatus of FIG. 1, eliminating certain structure and also showing some further structural detail.

FIGS. 1-6 illustrate an apparatus 10 for providing controlled displacement of an object 26. FIG. 1 is a front elevation view of the apparatus with object 26, latching means 40, and locking means 48 removed for illustrative purposes. As illustrated by FIG. 1, the apparatus 10 includes a laterally extending track means 12 which receives a carriage means 14 thereon in laterally displaceable relationship therewith. The track means 12 defines a laterally extending carriage movement path. The apparatus 10 includes a first and second stop means 16, 18 for limiting lateral displacement of the carriage means 14 along the laterally extending carriage movement path in first and second lateral directions 22, 24, respectively. Carriage means 14 is adapted for carrying an object 26 as illustrated in FIG. 2. The carriage means 14 is operatively mounted on the track means 12 and is laterally displaceable along the carriage movement path in the first and second lateral directions 22, 24. The carriage means has a forward end portion 30, a rear end portion 32, a top end portion 34, a bottom end portion 36, first lateral side portion 38, and a second lateral side portion 39, FIGS. 1 and 3-6. The carriage means has a central longitudinal axis AA, a central lateral axis BB, and a central vertical axis CC, which all intersect at right angles at a common point (not shown). The carriage means central lateral axis BB extends parallel to the laterally extending carriage movement path.

The carriage means 14 has a latched operating state, FIGS. 4 and 6, wherein movement thereof along the laterally extending carriage movement path in both the first and second lateral directions 22, 24 is latchingly prevented. The carriage means has an unlatched operating state, FIGS. 3 and 5, wherein movement thereof along the laterally extending carriage movement path in both the first and second lateral directions 22, 24 is unlatchingly enabled.

The apparatus includes a latching means 40, FIGS. 3-6, which is operably associated with the carriage means 14 and the laterally extending track means 12. The latching means is adapted for placing the carriage means in the latched operating state and in the unlatched operating state.

A shaft means 42 is operably mounted on the carriage means 14 and projects forwardly therefrom. The shaft means has a central longitudinal axis LL extending generally parallel to the carriage means central longitudinal axis AA and supports a driven gear means 44 thereon.

Driven gear means 44 is rotatable about the shaft means central longitudinal axis LL. The driven gear means is adapted for engaging a drive belt means 46. The driven gear means 44 has a locked operating state, FIGS. 3 and 5, wherein the driven gear means is lockingly restrained from rotating and wherein force applied to the gear means 44 by the belt means 46 is transferred to the carriage means 14 for causing carriage means displacement. The driven gear means 44 also has an unlocked state, FIGS. 4 and 6, wherein the driven gear means 44 is unlockingly enabled to rotate.

The apparatus includes a locking means 48 for lockingly engaging the driven gear means 44 for placing the driven gear means in the locked operating state and for unlockingly releasing the driven gear means for placing the driven gear means in the unlocked operating state.

Drive belt means 46 is continuously engaged with the driven gear means for transmitting force thereto. The drive belt means has a first portion 52 extending from the driven gear means 44 in the first lateral direction 22 and has a second portion 54 extending from the driven gear means 44 in the second lateral direction 24.

An actuator means 66 is provided for displacing the latching means In one embodiment, the latching means is brought into engagement with the actuator means 66 by downward movement of a vertical displacement assembly 140, FIG. 1.

Force transmitted from the drive belt means 46 to the driven gear means 44 in the first lateral direction 22 produces rotation of the driven gear means in a first rotation direction 62 when the driven gear means is in the unlocked operating state, FIGS. 4 and 6, and when the carriage means is in the latched operating state, FIGS. 4 and 6. Force transmitted from the drive belt means to the driven gear means in the first lateral direction 22 produces lateral displacement of the carriage means 14 in the first lateral direction 22 when the driven gear means 44 is in the locked operating state, FIGS. 3 and 5, and when the carriage means is in the unlatched operating state, FIGS. 3 and 5, and when the carriage means is disengaged from the first stop means 16, FIG. 1.

The force transmitted from the drive belt means 46 to the driven gear means 44 in the second lateral direction 24 produces rotation of the driven gear means in a second rotation direction 64 when the driven gear means 44 is in the unlocked operating state, FIGS. 4 and 6, and when the carriage means is in the latched operating state, FIGS. 4 and 6. Force transmitted from the drive belt means 46 to the driven gear means 44 in the second lateral direction 24 produces lateral displacement of the carriage means 14 in the second lateral direction 24 when the driven gear means 44 is in the locked operating state, FIGS. 3 and 5, and when the carriage means 14 is in the unlatched operating state, FIGS. 3 and 5, and when the carriage means is disengaged from the second stop means 18, FIG. 1.

Having thus described the apparatus 10 in general, various features of the apparatus will now be described in further detail.

Structural Components

As best illustrated in FIG. 1, the laterally extending track means 12 may comprise an upper track member 82 which may be a cylindrical shaft having a first end 84 and a second end 86. The track means 12 may also comprise a lower track member 88 which may comprise a tubular member having a polygonal cross-section, as illustrated in FIGS. 3–6. The lower track member 88 has a first end 90 and a second end 92 and is positioned parallel to the upper track member 82. The lower track member has a first recessed surface 89 at the first end thereof and a second recessed surface 91 at the second end thereof. Recessed surfaces 89, 91 are constructed and arranged to receive a portion of latching means 40 therein when the carriage means is in engaged relationship with an associated stop means 16, 18, as indicated at 14' and 14". The upper and lower track members 82, 88 are fixedly attached at the first ends 84, 90 thereof to a generally vertically extending block 94 having a vertically extending, inwardly facing surface 95 which may provide the first stop means 16.

The upper and lower track member second ends 86, 92 are fixedly attached to a second generally vertically extending block member 96 which may be identical in construction to the first block member 94 and which is positioned in mirror-image relationship therewith. The second block member 96 has a vertically extending, inwardly facing surface 97 which may provide the second stop means 18. First vertically extending block member 94 has vertically spaced-apart, belt-receiving idler gears 98, 100, mounted thereon. Gears 98, 100 may be conventional pulleys. The second block member 96 has a single belt-receiving idler gear 102 mounted thereon which may also comprise a conventional pulley. The lowermost surface of gear 98 is laterally aligned with the uppermost surface of gear 102, and the uppermost surface of gear 100 is laterally aligned with the lowermost surface of gear 102.

As illustrated in FIGS. 1 and 2, block member 94 has a pair of vertically spaced forward bearings 104, 106 and a pair of vertically spaced rear bearings 108, 110 which are adapted to ride on surface portions of an associated vertical post member 112. Post member 112 may have a cross-sectional shape similar to that of lower track member 88 described above. Second block member 96 may have four bearings 114, 116 (only two shown) which are configured identically to those described for the first block member and which rollingly engage the surface of a second vertical post member 118. Post member 118 may be identical in construction to first post member 112 and may be positioned in mirror-image relationship with post 112. The vertical post members 112, 118 may be fixedly attached at lower ends thereof to a housing bottom wall member 120 and may be fixedly attached at upper ends thereof to a housing top wall member 122.

As further illustrated in FIGS. 1 and 2, a vertically extending screw 124 is journaled at an upper end thereof to housing top wall 122 and is journaled at a lower end thereof to housing bottom wall 120. A reversible drive motor 126 having a drive shaft 128 and drive gear 130 is drivingly linked by drive belt 132 and gear 134 to screw 124. Drive motor 126 may be mounted rearwardly of a housing rear wall 125 on a mounting bracket 127. A threaded screw follower 136 is received on the screw 124 and is vertically displaceable therealong by rotation of the screw 124. Thus, rotation of drive motor 126 in a first direction causes screw follower 136 to move upwardly and rotation of motor 126 in the opposite direction causes screw follower 136 to move downwardly. As best illustrated in FIGS. 2, 3, and 4, screw follower 136 is fixedly associated with the track means as by attachment of the screw follower 136 to lower track member 88 by attachment bracket 138. Thus, the upper and lower track members 82, 84 and the block members 94, 96 define a vertical displacement assembly 140 which is vertically displaceable with respect to vertical post members 112, 118 through rotation of drive motor 126.

As best illustrated in FIGS. 1 and 2, vertical post 112 has an idler gear 141 journaled to an upper portion thereof. A driven gear 142 which is mounted on a drive shaft 143 of a reversible drive motor 144 is positioned directly below idler gear 141.

The drive belt means 46 is a continuous belt which is looped around gears 98, 102, 100, 142, and 141 in a generally T-shaped configuration. The trunk of this T-shaped belt configuration has an upper portion 145 which is engaged by an upper set of gears including driven gear means 44 on the carriage means 14. The trunk of the belt means T-shaped configuration also comprises a lower portion 146 which engages idler gears provided on a lower portion of the carriage means 14. The belt means may comprise a ribbed inner surface 147, FIG. 3, which is adapted to engage a ribbed exterior surface of the driven gear means 44 to provide nonslipping engagement between the driven gear means 44 and the drive belt means 46.

As best illustrated in FIGS. 3-6, carriage means 14 may comprise a block 150 having a central longitudinally extending bore 152 therein positioned coaxially with carriage means central longitudinal axis AA. Bore 152 is adapted to rotatingly receiving shaft 42 therein in coaxial relationship therewith. Shaft 42 may be mounted within bore 152 as by a bearing assembly (not shown), such as described in Methlie et al. U.S. patent application Ser. No. 278,102 incorporated by reference above. Shaft 42 may have an apparatus 26 for receiving an optical disk cartridge fixedly mounted on one end thereof which may be identical to the cartridge receiving apparatus described in Methlie et al. U.S. patent application Ser. No. 278,102. Block 150 may have an upper set of bearings 154, 156, 158, FIG. 1, mounted thereon which are adapted to rollingly engage track upper member 82. The block 150 also comprise a set of four lower bearings 160, 162, 164 (only three shown) which are adapted to rollingly engage the surface of lower track member 88. The upper and lower sets of bearings thus enable relatively low friction lateral displacement of the block member 150 along the upper and lower track members 82, 88.

The shaft means 42 has driven gear means 44 rotatably mounted thereon. As best illustrated in FIGS. 1, 2 and 3, driven gear means 44 may comprise a first, generally cylindrical drive belt engaging portion 170. The driven gear means 44 may also comprise a locking hub portion 172, FIGS. 2 and 3, which is fixedly attached to the gear engaging portion 170 as by connecting pins (not shown) or other conventional attachment means. The locking hub portion 172 in the preferred embodiment is positioned axially forward of the drive belt engaging portion 170. The driven gear means 44 is freely rotatable about shaft means 42 and is positioned in axially fixed relationship therewith as through the use of conventional spacer devices such as washers or the like (not shown). Drive belt engaging portion 170 may have a ribbed peripheral surface which is adapted to coact with a ribbed surface 147 of drive belt means 46. Locking hub portion 172 may comprise first and second lock engaging recessed surfaces 174, 176 therein which conform generally to the shape of an end portion of locking means 48 described in further detail below.

Locking means 48 may comprise a lock member 180 having a generally boot-shaped configuration which is mounted on a longitudinally extending shaft 182, FIGS. 3 and 5. The shaft 182 is rotatably received within a bore in the forward face of block 150 and lock member 180 is thus pivotal about pivot axis MM defined by shaft 182. Lock member 180 occupies a longitudinal position in radial alignment with locking hub portion 172. Lock member 180 has a toe portion 184 which is adapted to be received in either of the locking hub recessed surface portions 174, 176 to prevent rotation of the hub 172 and associated belt receiving portion 170. The lock member 180 is biased as by biasing spring 186 in a direction opposite the direction of extension of toe portion 184, i.e. in a driven gear means clockwise direction 188 as illustrated in FIG. 6. The lock member may be pivotally deflected in counterclockwise rotation direction 189 by latching means 40 as described below.

Latching means 40 may comprise a pivot member 190 having a central body portion 192; a forward, downwardly extending wing portion 194; and a rear, upwardly extending wing portion 196, as illustrated in FIGS. 3 and 5. The central body portion 192 is pivotally mounted on a laterally extending shaft 198 which is, in turn, mounted in block 150. Member 190 is thus pivotable about a laterally extending pivot axis NN. Pivot member 190 is received within a cavity 200 of block 150 having an upper cavity surface 202 and a lower cavity surface 204. Upper surface 202 limits pivotal deflection of member 190 in a first pivot direction 206, and lower surface 204 limits pivotal movement in a second pivot direction 208. The pivot member 190 has a head portion 210 at the terminal end of the forward wing portion 194. The head 210 has a first post member 212 projecting from a bottom portion thereof which is adapted to be received in recessed portions 89 and 91 provided on the lower guide member 88 to hold the carriage means in releasable fixed relationship with the lower guide member 88. A second post member 214, which is adapted to be engaged by the latch actuator means 66, is provided on an upper portion of the pivot member head 210. The second post member 214 is also adapted to slidingly engage a lower peripheral surface 216 of the lock member 180, FIGS. 3 and 4. As a result of this engagement between the lock member 180 and post 214, the lock member is caused to pivot in direction 189 when the latching member 190 pivots in direction 208. In one embodiment of the invention, a third post member 215 is provided which is also adapted to be engaged by the latch actuator means 66. Member 215 projects rearwardly from rear wing portion 196 of the latching member. As illustrated in FIG. 3, a biasing means such as coil spring 218 is positioned between the upper surface 202 of cavity 200 and the upper surface of the pivot member forward wing portion 194. Thus, the pivot member 190 is biased in pivotal rotation direction 206. The lock pivot member 180 and the latch pivot member 190 are constructed and arranged such that the lock member is always engaged with one of the hub recesses 174, 176 when the latch member is disengaged from an associated recessed surface 89 or 91 and vice versa. There is never a condition in which the lock member is disengaged from an associated hub recess and the latch member is disengaged from an associated lower member recess 89, 91.

As best illustrated in FIG. 1, a pair of upper idler pulleys 222, 224 are journaled to an upper forward portion of block 150 and rollingly engage the exterior surface of the drive belt means 46 to maintain the drive belt means in engaging contact with the driven gear means drive belt engaging portion 170. As also illustrated in FIG. 1, a pair of lower idler pulleys 226, 228 are journaled to a lower portion of block 150 and rollingly, guidingly engage the exterior surface of the drive belt means 46.

Latch actuator means 66 may comprise a horizontally extending bar 240 which is fixedly attached as by post members 242, 244 to housing bottom wall 120. The horizontal bar 240 is located directly below the lower post member 214 of the latching means 40 and is adapted to engage the post member 214 to produce relative upward movement thereof when the vertical displacement assembly 140 is moved sufficiently far downwardly, e.g. FIG. 5. As shown in phantom in FIGS. 1 and 3, in one embodiment an upper actuator bar 241 mounted on posts 243, 245 may be mounted on upper housing wall 122 directly above latch member third post 215. Bar 241 is adapted to engage post 215 to actuate the latch pivot member 190 when the vertical displacement assembly is moved sufficiently far upwardly. Thus, the actuator means 66 may comprise both an upper bar 244 and a lower bar 245 which provide identical actuating motion of the pivot member. The choice of which actuator bar is used may be determined by the proximity of the vertical displacement assembly to one bar or the other at the time actuation is desired.

Operation

The apparatus 10 has two different operating modes. In the first operating mode, FIGS. 3 and 5, the carriage means 14 is laterally displaceable along track means 12 by the belt means 46 while the gear means 44 is held rotationally stationary. In the second operating mode, FIGS. 4 and 6, the carriage means is held in stationary relationship with the track means and the gear means is rotatable by the belt means 46. Transition from one operating mode to the other is produced through combined operation of the latching means 40 and the locking means 48.

As illustrated in FIGS. 3 and 5, when the latching means 40 is rotated in direction 208, it engages the locking means 48, urging the toe portion 184 thereof upwardly. If the driven gear means 44 is rotating during the period when the locking means 48 is urged upwardly, the locking means toe portion will enter one of the hub recessed surface portions 174, 176, FIG. 5, thus locking the driven gear means against further rotation. As best illustrated by FIG. 3, the pivotal movement of the latching means which causes the locking means to engage the driven gear means also causes the latching means post 212 to be displaced from an associated track recess, e.g. 89, thus enabling lateral displacement of the carriage means. As illustrated by FIG. 5, the pivotal movement of the latching means which causes pivotal movement of the locking means is initiated by the engagement of the latching means upper post portion 214 by the actuator means 66. The actuator means is urged into engagement with post means 214 through downward movement of the vertical displacement assembly 140. The downward movement of the vertical displacement assembly is produced by rotation of screw 124 by screw motor 126, FIGS. 1 and 2.

Once the driven gear means 44 is locked against rotation, a portion of the drive belt means 46 which was in engagement with the gear means at the time it was locked is held in fixed, nonslipping relationship therewith by idlers 222, 224. As a result of this fixed relationship between the gear means and the engaged portion of the belt means, movement of the belt means causes the carriage means 14 to be pulled laterally along the track means 12. Thus, for example, when the carriage means 14 is in position as illustrated in solid lines in FIG. 1, drive motor torque which tends to urge the driven belt means in belt direction 147 causes the carriage means to be moved in lateral direction 24. Motor torque urging the belt in belt direction 148 causes the carriage means to be moved in lateral direction 22.

Recessed surface 89 in the guide means lower track member 88 is located at a position which is in vertical alignment with the latching means lower post 214 when the carriage means 14 is in an associated stop position indicated at 14' shown in phantom lines in FIG. 1. Similarly, recessed surface 91 is located in vertical alignment with post 214 when the carriage means is in engagement with stop means 18 as indicated at 14" in FIG. 1. Once the carriage means 14 has travelled laterally to a stop position, e.g. the left stop position illustrated in FIG. 1, the latching means, in the absence of actuator means 66, drops into an associated recess, e.g. 89. Once the latching means has moved into this latching position, which is best illustrated in FIG. 4, the locking means 48 may temporarily remain in locking engagement with the locking hub 150 due to pinching torque applied thereto by the hub means so long as torque is provided from motor 144. However, after drive torque is terminated, the locking means 48 bias spring 186 causes it to pivot in direction 188 until contacting latching means post 214, as illustrated in FIGS. 4 and 6. The latching means is now latched and prevents relative carriage movement and the locking means is unlocked and enables rotation of driven gear means 44. Thus, when torque is again applied by the motor 144, the drive belt means causes driven gear means 44 to rotate about its axis LL while the carriage means 14 remains stationary.

In order to again enable carriage means displacement, the vertical displacement assembly 140 is again moved down into engagement with actuator means 66 until locking engagement of the driven gear means 44 is produced. Thereafter, the carriage means 14 may be displaced laterally through application of torque from motor 144 in the appropriate direction, etc.

As best illustrated in FIG. 3, the latching member lower post 214 is adapted to ride on a lower peripheral surface portion 87 of a lower track member 88 once the carriage means 14 is laterally displaced from the associated lower track member recess 89 or 91. Thus, after initial disengagement of the latching means 40 from recess, e.g. 89, and a small amount of lateral displacement of the carriage means, e.g. 0.2 inches, the vertical displacement assembly 140 may be moved out of engagement with the actuator means 66 without causing the locking means 48 to become disengaged from the driven gear means 44, even if a power failure should cause the torque applied by the drive motor 144 to be temporarily terminated. Thus, once the motor is restarted after such a power failure, the lateral movement of the carriage means 14 may continue in the initial lateral direction, e.g. 24, until the carriage means reaches a stop means 18, FIG. 1 in phantom. Once the carriage means engages a stop means and torque from the drive motor 144 is terminated, the latching means 40 and locking means 48 will move into their latched and unlocked positions, respectively, preventing lateral displacement of the carriage means 14 in either direction and enabling rotation of the driven gear means in either direction.

In one preferred embodiment of the invention, the T-belt drive motor 144 is provided with a control means 250 which causes it to terminate its operation and to reverse its polarity each time the carriage means 14 reaches one of the stop locations indicated in phantom in FIG. 1 and also after a predetermined number of driven gear means rotations following each period of carriage movement. In one preferred embodiment, this function of terminating and reversing motor operation is initiated by a displacement sensing control assembly 252 which senses the amount of motor displacement corresponding to the amount of drive belt displacement required to move the carriage means 14 between the two stop means 16 and 18 or required to rotate the driven gear means through the predetermined number of rotations. The assembly 252 may comprise a conventional electronic motor encoder, which produces a predetermined number of encoder pulses per motor revolution, and a microcomputer equipped with a counter for counting encoder pulses and appropriate software for comparing the count to a first predetermined number associated with the carriage displacement distance between stops 16 and 18 and a second predetermined number associated with the predetermined amount of gear means rotation. Such displacement sensing control means are well-known in the art and may be of a type described in the above-referenced Methlie et al. U.S. patent application Ser. No. 278,102.

The rotational movement of driven gear means 44, in one preferred embodiment, is used to produce longitudinal and flipping displacement of an optical disk cartridge 27 which is received in an optical disk handling apparatus 26 shown generally in FIG. 2, which may be identical to the optical disk handling apparatus described in Methlie et al. U.S. patent application Ser. No. 278,102.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An apparatus for providing controlled displacement of an object comprising:
   a) a laterally extending track means for receiving a carriage means thereon in laterally displaceable relationship therewith for defining a laterally extending carriage movement path;
   b) first and second stop means for limiting lateral displacement of said carriage means along said laterally extending carriage movement path in a first lateral direction and a second lateral direction, respectively;
   c) carriage means, for carrying an object, operably mounted on said track means and movable along said laterally extending carriage movement path in said first lateral direction and said second lateral direction, said carriage means having a forward end portion, a rear end portion, a top end portion, a bottom end portion, a first lateral side portion, a second lateral side portion, a central longitudinal axis, a central lateral axis, and a central vertical axis; said carriage means central lateral axis extending parallel to said laterally extending carriage movement path; said carriage means having a latched operating state wherein movement thereof along said laterally extending carriage movement path in both said first and second lateral directions is latchingly prevented, said carriage means having an unlatched operating state wherein movement thereof along said laterally extending carriage movement path in both said first and second lateral directions is unlatchingly enabled;
   d) latching means operably associated with said carriage means and said laterally extending track means for placing said carriage means in said latched operating state and for placing said carriage means in said unlatched operating state;
   e) shaft means operably mounted on said carriage means and projecting forwardly therefrom, said shaft means having a central longitudinal axis extending generally parallel to said carriage means central longitudinal axis, for supporting a driven gear means thereon;
   f) driven gear means having a locked operating state wherein said driven gear means is lockingly restrained from rotating and an unlocked state wherein said driven gear means is unlockingly enabled to rotate; said driven gear means being mounted on said shaft means and rotatable about said shaft means central longitudinal axis for engaging a drive belt means and for transmitting force therefrom to said carriage means for laterally displacing said carriage means during said driven gear means locked operating state;
   g) locking means for lockingly engaging said driven gear means for placing said driven gear means in said locked operating state and for unlockingly releasing said driven gear means for placing said driven gear means in said unlocked operating state;
   h) drive belt means engaged with said driven gear means for transmitting force thereto; said drive belt means having a first portion extending from said driven gear means in said first lateral direction and having a second portion extending from said driven gear means in said second lateral direction;
   whereby force transmitted from said drive belt means to said driven gear means in said first lateral direction produces rotation of said driven gear means in a first rotation direction when said driven gear means is in said unlocked operating state and when said carriage means is in said latched operating state;
   whereby force transmitted from said drive belt means to said driven gear means in said first lateral direction produces lateral displacement of said carriage means in said first lateral direction when said driven gear means is in said locked operating state and when said carriage means is in said unlatched operating state and when said carriage means is disengaged from said first stop means;
   whereby force transmitted from said drive belt means to said driven gear means in said second lateral direction produces rotation of said driven gear means in a second rotation direction when said driven gear means is in said unlocked operating state and when said carriage means is in said latched operating state; and whereby force transmitted from said drive belt means to said driven gear means in said second lateral direction produces lateral displacement of said carriage means in said second lateral direction when said driven gear means is in said locked operating state and when said carriage means is in said unlatched operating state and when said carriage means is disengaged from said second stop means.

2. The invention of claim 1 further comprising:
reversible rotating drive means rotatable in a first and second rotation direction for providing driving force to said drive belt means in a first direction and a second direction; and
displacement sensitive control means for terminating operation of said drive means and reversing the direction of operation of said drive means in response to sensing a rotational displacement of said drive means associated with a displacement of said carriage means of a predetermined distance.

3. The invention of claim 1 wherein said latching means comprises:
a deflectable latching member having a latched position associated with said carriage means latched operating state and having a unlatched position associated with said carriage means unlatched operating state;
latch biasing means for biasing said latching member in said latched position;
latch actuator means for engaging said latching member and deflectingly urging said latching member from said latched position to said unlatched position.

4. The invention of claim 3 wherein said locking means comprises:
a deflectable locking member having a locked position associated with said locked operating state of said driven gear means, and having an unlocked position associated with said unlocked operating state of said driven gear means;
lock biasing means for biasing said locking means in said unlocked position;
lock actuator means for engaging said locking member and deflectingly moving said locking member from said unlocked position to said locked position.

5. The invention of claim 4 wherein said lock actuator means comprises said deflectable latching member.

6. The invention of claim 5 wherein said carriage means is vertically displaceable relative said latch actuator means.

7. The invention of claim 7 wherein said latching member is mounted on said carriage means and wherein said latching means further comprises latch catch means provided on said track means for engaging said latching member.

8. The invention of claim 7 wherein said locking member is mounted on said carriage means and wherein said locking means further comprises lock catch means operatively associated with said gear means for engaging said locking member.

9. The invention of claim 8 wherein said latch catch comprises at least one recess in said track means.

10. The invention of claim 9 wherein said driven gear means comprises a cylindrical hub and wherein said lock catch means comprises at least one recess in said hub.

11. The invention of claim 10 wherein said latching member is pivotally mounted on said carriage means.

12. The invention of claim 11 wherein said latching member comprises a pivot axis extending laterally of said carriage means.

13. The invention of claim 10 wherein said locking member is pivotally mounted on said carriage means.

14. The invention of claim 13 wherein said locking member comprises a pivot axis extending longitudinally of said carriage means.

15. The invention of claim 14 further comprising latch member holding means for holding said latch member in said unlatched position thereof subsequent to removal of said latch actuator means.

16. The invention of claim 15 wherein said latch member holding means comprises a laterally extending surface portion of said track means.

17. The invention of claim 7 said latch catch means comprising a first latch catch positioned proximate a first end of said track means.

18. The invention of claim 17 said latch catch means comprising a second latch catch positioned proximate a second end of said track means.

19. A mechanical assembly for alternately producing displacement of a carriage with respect to a carriage track and rotation of a gear mounted on the carriage, in response to torque provided to said gear from a single drive motor comprising:
a) latching means, having a latched state and an unlatched state, operably associated with said carriage for latchingly preventing relative movement between said carriage and said track during said latched state;
b) locking means, having a locked state and an unlocked state, operatively associated with said gear for lockingly preventing relative rotation of said gear during said locked state;
said latching means being in said latched state when said locking means is in said unlocked state, said latching means being in said unlatched state when said locking means is in said locked state;
said latching means comprising:
a deflectable latching member mounted on said carriage; and
at least one latch catch surface fixedly associated with said carriage track.

20. The invention of claim 19 comprising a first latch catch surface located at a first end of said carriage track and a second latch catch surface located at a second end of said carriage track; said carriage comprising a first and a second latching position along said track corresponding to said first and second catch surfaces.

21. The invention of claim 20, said deflectable locking member comprising:
a deflectable locking member mounted on said carriage; and
at least one lock latch catch surface fixedly associated with said gear.

22. The invention of claim 21 further comprising latch actuator means for deflecting said latch member from engagement with said latch catch surfaces for moving said latching means from said latched state to said unlatched state.

23. The invention of claim 22, said latching member comprising a locking member actuator means for moving said locking member into engagement with said lock catch surface for moving said locking means from said unlocked state to said locked state.

24. The invention of claim 23 further comprising:

drive motor means for providing torque for rotating said gear and displacing said carriage along said track; and
continuous belt means for drivingly linking said gear and said drive motor.

25. The invention of claim 24 further comprising:
shaft means rotatably received in said carriage for rotatably supporting said gear thereon.
26. The invention of claim 25, said shaft means supporting an optical disk handling apparatus.

* * * * *